United States Patent [19]

Markwart et al.

[11] Patent Number: 5,695,396
[45] Date of Patent: Dec. 9, 1997

[54] VENTILATING SYSTEM FOR REDUCING CONTAMINATIONS IN THE AIR OF AN AIRCRAFT

[75] Inventors: Michael Markwart, Halstenbek, Germany; Klaus Petry, Georgetown, Tex.; Thomas Scherer, Hamburg, Germany

[73] Assignee: Daimler-Benz Aerospace Airbus GmbH, Hamburg, Germany

[21] Appl. No.: 617,487

[22] Filed: Mar. 15, 1996

[30] Foreign Application Priority Data

Mar. 17, 1995 [DE] Germany ............... 195 09 773.4

[51] Int. Cl.$^6$ .................................................. B64D 13/06
[52] U.S. Cl. ................................................. 454/76; 454/71
[58] Field of Search ................................ 454/70, 71, 73, 454/74, 76, 99, 103, 105, 107, 112

[56] References Cited

U.S. PATENT DOCUMENTS

| | | | |
|---|---|---|---|
| 3,173,275 | 3/1965 | Urian | 454/112 X |
| 4,033,247 | 7/1977 | Murphy | 454/76 |
| 4,742,760 | 5/1988 | Horstman et al. | 454/76 |
| 5,261,855 | 11/1993 | Law et al. | 454/76 |
| 5,516,330 | 5/1996 | Dechow et al. | 454/74 |

FOREIGN PATENT DOCUMENTS

| | | |
|---|---|---|
| 0301606 | 4/1992 | European Pat. Off. |
| 865358 | 2/1953 | Germany |

*Primary Examiner*—Harold Joyce
*Attorney, Agent, or Firm*—W. G. Fasse; W. F. Fasse

[57] ABSTRACT

An air supply system for an aircraft cabin reduces the concentration of contaminations of the air in the cabin by a flexibly controllable valve system that comprises pairs of valves which on the one hand are ganged to respective air openings. One valve of a pair is connected to a fresh air or mixed air supply line. The other valve of a pair is connected to a suction or exhaust duct. Thus, depending on which valve in a pair is open and which is closed, the respective air opening can function as an air outlet for supply of mixed or fresh air into the cabin or as a suction port. Such a system permits a flexible volume control of the supply of fresh air into selectable cabin sections as well as a flexible volume control for the removal of used air from respective cabin sections. Additionally, it is now possible to increase the size of the non-smoking section at the expense of the smoking section or vice versa simply by a respective valve control.

21 Claims, 5 Drawing Sheets

VENTILATING SYSTEM FOR REDUCING CONTAMINATIONS IN THE AIR OF AN AIRCRAFT

FIELD OF THE INVENTION

The invention relates to an aircraft equipped with a ventilating system that permits different ventilation controls in different areas of the aircraft cabin.

BACKGROUND INFORMATION

The pressurized body of certain known aircraft types is equipped with a ventilation system in which a constant volume flow of fresh air is supplied to cabin zones for ventilation during flight and on the ground. The air quality is maintained especially in the cabin area by this constant volume flow.

In order to keep the cabin temperature and the velocity of the ventilation air at the comfort level required for passengers, it is known to admix a constant volume flow of recirculation air to the fresh air. The recirculation air is used cabin air, however, still of reusable quality after treatment. The admixing takes place through valves in the air conditioning units, whereby these valves are controlled to pass a constant volume flow referred to as the "bleed air". Changes in the constant volume flow or bleed air take place only as a result of errors.

Typical air conditioning systems equipped for a return flow of used cabin air are provided with additional openings or ports located in the upper zones near the ceiling of a passenger cabin, in a kitchen area, and in a toilet area. These additional ports are connected to suction pipes for the removal of odors and tobacco smoke. The contaminated air is sucked off completely or partially through special ducts and vented to the atmosphere.

This type of venting contaminated cabin air from an aircraft involves numerous disadvantages. The use of special suction pipes for the removal of odorous and smoky air and the use of additional ports for this purpose makes the air supply and conditioning system of the aircraft more complex and increases the weight as well as the energy consumption of the passenger aircraft. The need for additional discharge ports for the withdrawal of contaminated air requires a substantial installation effort and expense, especially when changes in the seating arrangement in the passenger area must be made with regard to the allocation of cabin space to smoking and nonsmoking sections. Furthermore, it is noted that the air space near the floor of the passenger cabin in nonsmoking sections contains air that is more contaminated than air near the ceiling in the nonsmoking sections. These nonsmoking sections normally take up the larger proportion of the available cabin space. This fact is not taken into account in conventional systems. Moreover, the quality of the cabin air in the passenger areas of the aircraft is presently assured only by the constant fresh air flow taken in from the outside of the aircraft.

The constant fresh air supply volume is selected with due regard to the desired air quality onboard the aircraft. However, such approach does not take into account the generation of contaminations on board the aircraft. Such generation of contaminated air depends on many variables, for example how many smokers smoke and how often, smells generated by and emanating from the food distributed onboard the aircraft, and other human generat contaminations. These factors adversely affect the cleanliness of the cabin air which in turn has a negative effect on the comfort of passengers and crew alike.

European Patent Publication EP 0,301,606 B1 (Horstman et al.) published on Feb. 1, 1989 discloses an aircraft cabin ventilation system for reducing the concentration of gaseous and particular contaminants in the air of an aircraft cabin that is divided into an upper zone disposed below an overhead shell or ceiling and a lower zone disposed adjacent a cabin floor. The known system tries to take into account that the concentration of contaminations in smoking sections of aircraft cabin air is largest near the ceiling and lower near the cabin floor. Thus, in the known system the heavily contaminated air withdrawn near the ceiling is vented out of the cabin and air taken near the cabin floor is recirculated. However, recirculating air from the zone near the cabin floor is still contaminated with carbon dioxide and dust particles. Further, a portion of the air drawn from the cabin section near the ceiling may also be recirculated into the suction port of a recirculating fan. The proportion of recirculation depends on the pressure that must be maintained in the cabin. This type of recirculation still does not permit to supply air as clean as is desirable into the cabin of an aircraft because contaminations in the recirculated air are not removed to a substantial extent. Further, the known system requires substantial additional equipment for withdrawing the air and such equipment is not easily converted when it becomes necessary to either enlarge or reduce the nonsmoking section relative to the smoking section and vice versa.

Copending U.S. Ser. No. 08/324,221 (Dechow et al.) filed on Oct. 17, 1994 discloses an air conditioning system for a passenger aircraft in which a closed loop air flow is maintained into which fresh air is introduced either through a fresh air treatment unit or through a trim valve or through both. The recirculated air is treated and supplied to the cabin space as mixed air to which external fresh air has been added. A first series connection of system components includes a fresh air intake, a closed loop control volume flow control valve, an air conditioner, an air mixer, and the space to be air conditioned all interconnected by air ducts. The closed loop control is responsive to the cabin pressure and controls the air volume through the flow control valve. The air conditioner unit is also controlled by a respective closed loop control. A second series connection includes a filter, a blower, and a heat exchanger and preferably also a $CO_2$ adsorber connected in series between the blower and the heat exchanger. The second series connection forms a recycling circuit flow connected in parallel to the air mixer and to the space to be air conditioned. This type of system still leaves room for improvement with regard to the supply of clean air particularly to smoking zones in the aircraft cabin and with regard to cleaning air volumes withdrawn near the floor of the cabin. Further improvement can be made with regard to selectively adding space to the nonsmoking section at the expense of the smoking section or vice versa.

German Patent 865,358 (Köster et al.) published on Feb. 2, 1953 discloses a method and apparatus for air conditioning of rooms with a circulating flow of an air volume with the admixing of fresh air volumes in response to the measurement of carbon dioxide sensed in the room air. A valve is controlled by a signal generated by a carbon dioxide sensor and fresh air sucked in from the outside of the room passes through the controlled valve, thereby monitoring the $CO_2$ concentration. Such a system still leaves room for improvement with regard to the removal of germs, odor causing components, tobacco smoke, and other contaminations present in relative small amounts.

OBJECTS OF THE INVENTION

In view of the above it is the aim of the invention to achieve the following objects singly or in combination:

to construct an air supply system for an aircraft in such a way that valve adjustments make it possible to selectively increase or decrease the nonsmoking section while simultaneously and correspondingly decreasing or increasing the smoking section in an aircraft cabin;

to flexibly supply air and remove air from the smoking and nonsmoking sections in a passenger aircraft cabin, whereby changes in the respective air supply and removal can be quickly made and individually for different seating arrangements or cabin portions;

to reduce the concentration of air contaminants in the air supply for an aircraft such as odor causing substances or gases, dirt particles, carbon dioxide, tobacco smoke, and the like; and to avoid any physical reconstruction or rearrangement of the air supply system other than the mere adjustment of valves when the nonsmoking and smoking sections in an aircraft cabin are to be modified or changed in size.

SUMMARY OF THE INVENTION

The invention has achieved the above objects by the combination of the following features. A ventilating system for a passenger aircraft having a pressurizable body enclosing a cabin having a cabin floor, passenger seats on said cabin floor, a cabin ceiling above said seats, and an underfloor space in said body below said floor, comprises a plurality of first air flow openings positioned in said cabin for serving individual passenger seats, a plurality of second air flow openings in said ceiling for serving said cabin, a treated fresh air supply line for supplying treated air into said cabin and an exhaust line for removing used air from said cabin, a suction fan connected to said main exhaust line, at least a first pair and a second pair of air flow control valves, each pair of said air flow control valves comprising a first valve connected to said main fresh air supply line and a second valve connected to said main exhaust line, said control valves forming said first pair being further connected to a first common junction, said control valves forming said second pair being further connected to a second common junction, said first common junction being connected to said first air flow openings for controlling the flow of fresh air through said first air flow openings into said cabin and for controlling the flow of used air through said first air flow openings out of said cabin depending on which of said first and second valves of said first pair of valves is open and which valve is closed, said second common junction being connected to at least one of said second air flow openings for controlling the flow of fresh air or treated air through said at least one second air flow opening into said cabin and for controlling the flow of used air through said at least one second air flow opening out of said cabin depending on which of said first and second valves of said second pair of valves is open and which valve is closed, whereby feeding of fresh air and removal of used air can be individually controlled for different areas of said cabin.

The primary advantage of the invention is seen in that simple valve controls of at least one pair of valves now make it possible to control the volume of used air removed from a particular cabin area and the volume of fresh air or mixed air supplied to that area individually for the area which may be as small as one passenger seat or a group of passenger seats.

With the aid of such a valve control that may be carried out manually in smaller aircraft or from a control panel electrically in larger aircraft, it is now possible to enlarge the nonsmoking section at the expense of the smoking section and vice versa depending on the requirements for any particular flight. It is now further possible to more flexibly control the air quality in an aircraft compared to the prior art discussed above.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

The next following remarks apply to all figures. The arrows in all figures represent air flow. These arrows are not provided with reference numbers, except as follows. Arrow F represents fresh air taken from the environment or recirculated. Arrow U represents used air discharged to the environment. Arrow M represents mixed air for replenishing used air in the cabin 1. Arrows pointing away from air flow openings shown as boxes represent mixed or fresh air flowing into the cabin 1. Arrows pointing into these boxes represent suction air to be removed from the cabin 1. Thus, a box with an arrow pointing into the box is a suction port and a box with an arrow pointing away from the box is an air outlet.

Further, the terms duct, pipe, line, and conduit or ducts, pipes, lines, and conduits are considered to be synonyms herein. Dots marking junctions or intersections of pipes indicate a flow permitting interconnection.

Figure 1:
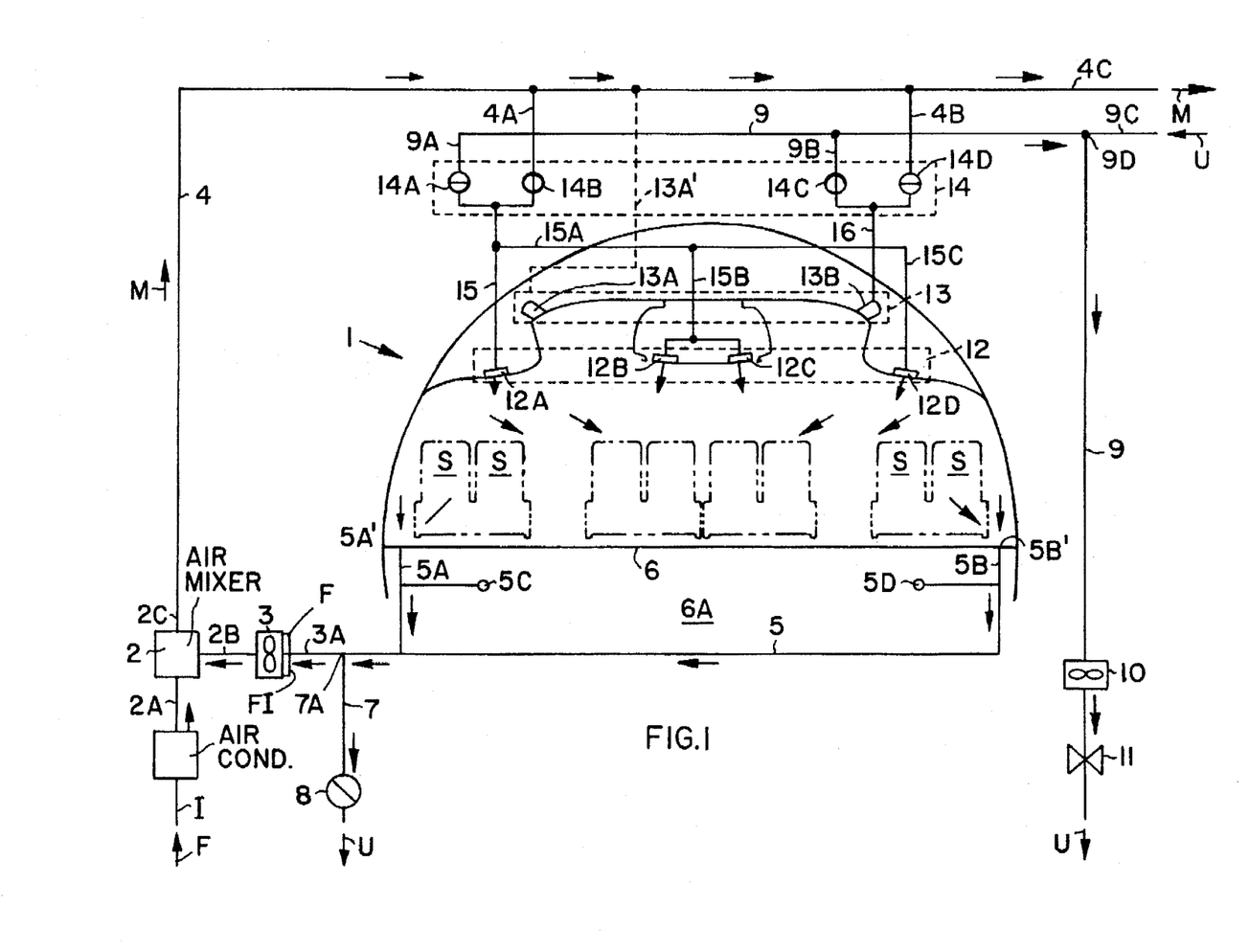
FIG. 1 shows a schematic sectional view through an aircraft cabin equipped with an air exchange system according to the invention, wherein a first pair of valves controls the volume of air flow through first air openings while a second pair of valves controls the volume of air flow through at least one second air opening, whereby the valves are in such opened or closed positions that the respective air openings can function as air outlets for fresh or mixed air or these openings can function as suction ports for removing used air.

FIG. 1 shows the cabin 1 connected to the present air supply system including an air mixing unit 2 having a first inlet 2A connected, preferably through an air conditioner to receive fresh air F from outside the aircraft. The air conditioner is connected with its inlet I to a conventional fresh air intake not shown. A further inlet 2B of the air mixer 2 is connected to an outlet port of a blower 3. A pressure outlet 2C of the mixer 2 is connected to an air supply duct 4 leading with its branch ducts 4A, 4B and 4C to various sections and zones in the aircraft cabin for supplying fresh or mixed air to these sections or zones. An exhaust duct 9 is connected for removal of used air U as will be described in more detail below. A further suction or exhaust air return duct 5 is connected with its branch lines 5A, 5B to suction ports 5A', 5B' in the floor 6 of the aircraft cabin for removing air out of the cabin near the cabin floor 6. Further used air intakes 5C and 5D are provided in a space 6A below the cabin floor 6. These intakes 5C, 5D are connected to the branch lines 5A, 5B or directly to duct 5.

The air return duct 5 is connected to the suction inlet 3A of the blower 3. A used air discharge line or tap duct 7 is connected at a junction 7A to the return duct 5 and through a pressure control valve 8 to a used air discharge port in the aircraft body for discharging a portion of used air U to the atmosphere. Another portion of used air passes through a filter FI into the blower 3 and from there to the mixer 2.

The exhaust duct 9 is connected to the suction port of a blower 10. The outlet of the blower 10 is connected through a discharge device such as a venturi nozzle 11 to the atmosphere. The discharge or exhaust duct 9 is further connected to suction duct sections 9A, 9B leading to flow control valves 14A, 14C respectively. A further exhaust duct section 9C leads to odor generating sections of the aircraft cabin such as a kitchen, toilets or the like for a direct discharge of used air from these sections to the atmosphere with the aid of the suction or exhaust blower 10.

According to the invention a first group 12 of air flow openings 12A, 12B, 12C and 12D and a second group 13 of openings 13A and 13B are constructed to function either as air outlets or as suction ports. The openings of the first group 12 are positioned, for example in downwardly facing lower walls of luggage compartments so as to allocate these air flow openings to individual passenger seats S or groups of seats. The air flow openings 13A and 13B of the second group 13 are located in the aircraft ceiling or walls and at least certain of these openings are also constructed to function either as an air outlet or as a suction port as will be described in more detail below with reference to FIG. 9.

According to the invention controllable air volume flow valves 14 forming at least one pair are arranged in a Y-configuration providing two separate ports and one common port. Preferably, a plurality of pairs of valves 14A, 14B; 14C and 14D, are provided for example. The number of valve pairs actually used will depend on the particular type of aircraft and the degree of control desired. These valves 14 may be manually controlled, or they may be automatically controlled by solenoids which in turn are connected for control to a control panel conveniently positioned for access by flight attendants. Manually controlled valves will preferably be positioned in convenient reach by a passenger so that the passenger can control the supply of fresh air as well as the removal of used air in his immediate seat area.

The Y-configuration according to the invention is achieved in that one port of each valve in a pair is ganged and connected to the respective air opening while the other port of the valves of a pair is either connected to the supply duct 4 or to the exhaust duct. More specifically, one port of each of the valves 14A and 14B forming a pair is ganged to an air pipe 15 connected to the air opening 12A. The pipe 15 has branch lines 15A leading to further branch lines 15B connected to air openings 12B and 12C and a branch line 15C leading to air opening 12D. The other port of valve 14A is connected through its branch line 9A to the exhaust duct 9. The other port of valve 14B is connected through branch line 14A to the supply duct 4. Similarly, the other port of valve 14C is connected to exhaust branch line 9B while the other port of valve 14D is connected through branch line 4B to the supply duct 4. The air opening 13A may either be directly connected to the supply line 4 as shown by the dashed supply line 13A'. Alternatively, the air opening 13A may be connected to a duct 16 that gangs ports of the valves 14C and 14D for connection to the air opening 13B. In the latter instance the flow through both air openings 13A and 13B will be controllable by the valves 14C and 14D.

The supply of fresh or mixed air to the respective air openings or the withdrawal of used air will depend on the open or closed position of the valves 14A, 14B, 14C and 14D. In the shown positions the valves 14A and 14D are closed while the valves 14B and 14C are open. As a result, mixed or fresh air is supplied to all air openings 12A, 12B 12C and 12D of the first group 12 of openings which now function as air outlets. Opening 13A also functions as an air outlet due to its direct connection 13A' to the supply duct 4. Air opening 13B functions as a suction port due to its connection through the open valve 14C and through the suction branch line 9B to the suction or exhaust duct 9.

Referring further to FIG. 1, the venturi nozzle 11 is arranged downstream of the exhaust blower 10 as viewed in the flow direction of the used air U through the blower 10 and through the venturi nozzle 11 for discharge to the atmosphere.

The volume of air discharged through the pressure control valve 8 is correlated to the volume of fresh air supplied through the duct 4 in all instances of various valve open and valve closed positions of the valves in the valve unit 14 to maintain the required cabin pressurization relative to a rated or required pressurization value. Thus, more or less air can be discharged through the pressure control valve 8 as required.

The valve positions shown in FIG. 1, namely 14A and 14D closed and 14B and 14C opened are typical for a smoking section, however the same cabin space can now be quickly converted into a nonsmoking section by closing valve 14C and opening valve 14D, thereby supplying additional fresh air or mixed air into the cabin.

Incidentally, the fresh air is preferably tapped off from an engine compartment so that the fresh air F is preheated prior to treatment in the air conditioner upstream of the mixer 2. Further, the filter FI will preferably be positioned in the inlet port of the blower 3 for filtering that volume portion of used air that is being recirculated. Additional filters are preferably provided for each of the individual air openings as will be described below with reference to FIG. 9, particularly if these air openings function as suction ports.

As mentioned, during flight the cabin pressure is maintained under the control of the pressure responsive valve 8, whereby the volume of removed used air U will include a proportion of air sucked out of the underfloor space 6A through suction ports 5C and 5D connected to the suction branch lines 5A and 5B respectively which in turn are connected to the suction duct 5. The valve 8 is responsive to the pressure difference between the pressure inside the cabin and outside the cabin during flight. Similarly, the exhaust blower 10 is preferably provided with a pressure responsive switch not shown so as to operate the section blower 10 during flight also with due regard to the required cabin pressurization. However, on the ground when the aircraft is parked with passengers in the aircraft, the blower 10 will be operated independently of its pressure responsive switch to maintain a required level of fresh air or mixed air in the aircraft.

Figure 2:
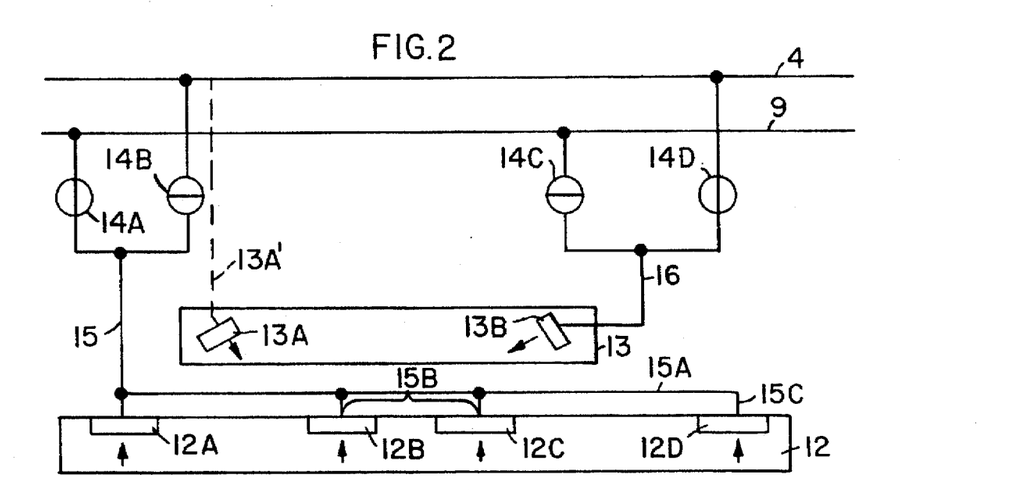
FIG. 2 shows schematically two pairs of valves of FIG. 1 switched so that the first air openings serve as suction ports while the second air opening discharges fresh or mixed air.

FIG. 2 shows another valve open and closed status combination for a smoking section. Valves 14A and 14D are now open and valves 14B and 14C are closed opposite to the valve positions shown in FIG. 1. All individual air openings 12A to 12D now function as suction ports and the air openings 13A, 13B in the ceiling function as air outlets.

Figure 3:
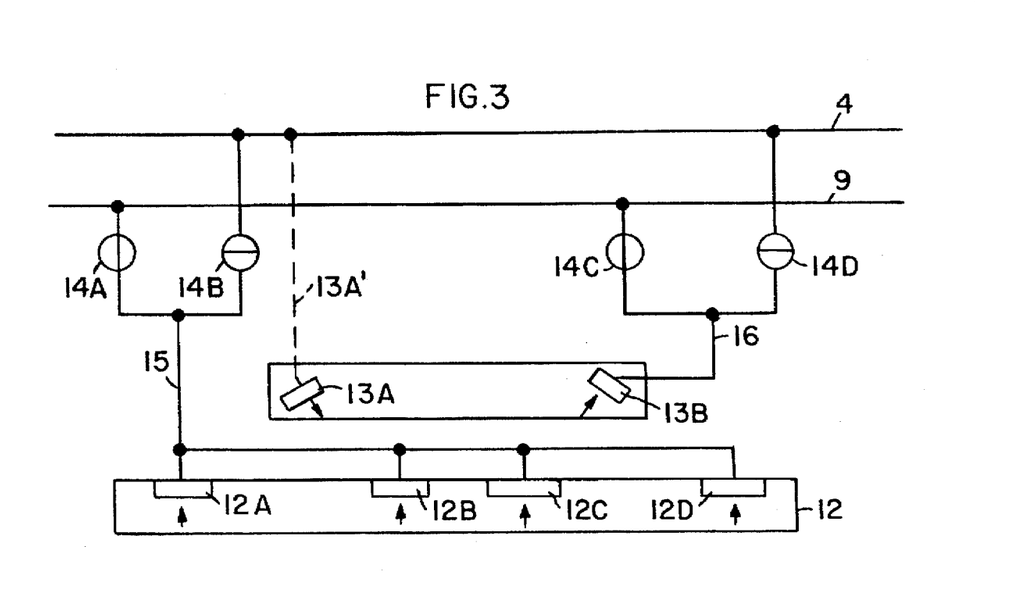
FIG. 3 is a schematic view similar to that of FIG. 2, but with the valves switched so that all air flow openings are now suction ports.

FIG. 3 illustrates yet another ventilation possibility for a smoking section. Valves 14A and 14C functioning as suction valves are open and valves 14B and 14D are closed. Thus, fresh air is supplied only through the direct connection 13A' to the air opening 13A functioning as an air outlet.

Figure 4:
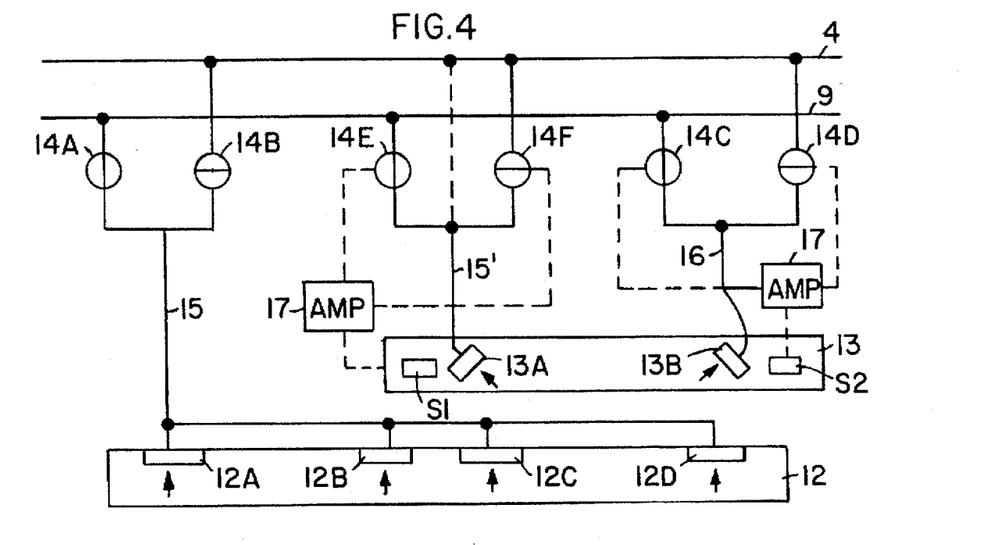
FIG. 4 shows an embodiment of the present air supply system with, for example, three pairs of valves so switched that all first and second air flow openings are suction ports, and including air quality sensors for controlling respective valves.

FIG. 4 shows a modification with three valve pairs. Volume flow control valves 14E and 14F form a pair ganged through an air conduit 15' to the air opening 13A. Valve 14A is connected to the suction duct 9. Valve 14F is connected to the supply duct 4. Valves 14A, 14E and 14C are connected to the suction duct 9 and are open while closed valves 14B, 14F, and 14D are connected to the supply duct 4. Thus, all air openings 12 and 13 now function as suction ports as indicated by the respective arrows. If the position of the valves 14E and 14F is changed by closing valve 14A and opening valve 14F the opening 13A will function as an air outlet as in the above described FIGS. 1, 2 and 3.

FIG. 4 further shows two sensors S1 and S2 positioned, for example near the openings 13A and 13B to measure the air quality such as the carbon dioxide content. These sensors S1 and S2 provide sensor signals to two amplifiers 17 which in turn provide valve control signals, for examples to valves 14E, 14F and 14C as well as 14D as indicated by the dashed line connections. The sensors S1 and S2 will be positioned where their operation will be most efficient, not necessarily close to the openings 13A, 13B.

Figure 5:
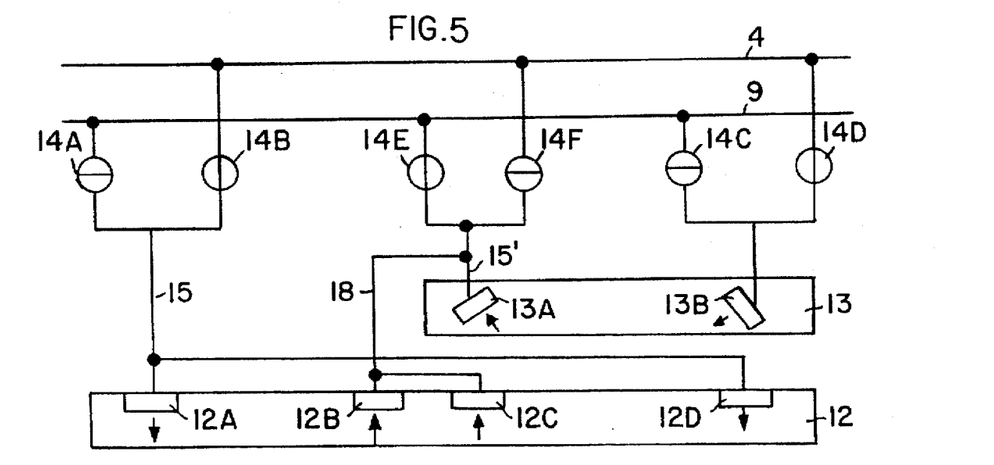
FIG. 5 is a view similar to FIG. 4, but with a different switched state for at least certain valves compared to FIG. 4, whereby certain air flow openings function as suction ports while other air flow openings function as air outlets.

FIG. 5 shows another embodiment with three valve pairs, however with a modification in that the valves 14E and 14F are ganged through an additional branch line 18 to the centrally positioned air openings 12B and 12C in addition to being connected through the air duct connection 15' to the air opening 13A. The valves 14E and 14F have the same open and closed position respectively as in FIG. 4. However, due to the further branch line 18 now the centrally positioned openings 12B, 12C and 13A function as suction ports. The valves 14A and 14B, as well as 14C and 14D have been switched to their respective opposite positions so that the openings 12A and 12D as well as 13B now function as air outlets.

In view of the disclosure of FIGS. 2, 3, 4 and 5 it will be appreciated that various valve open and closed combinations will enable a fine tuned control of the supply of mixed air as well as the withdrawal of used air and an easy adaptation of the air circulation to the needs of the particular cabin section and even the particular seat.

Figure 6:
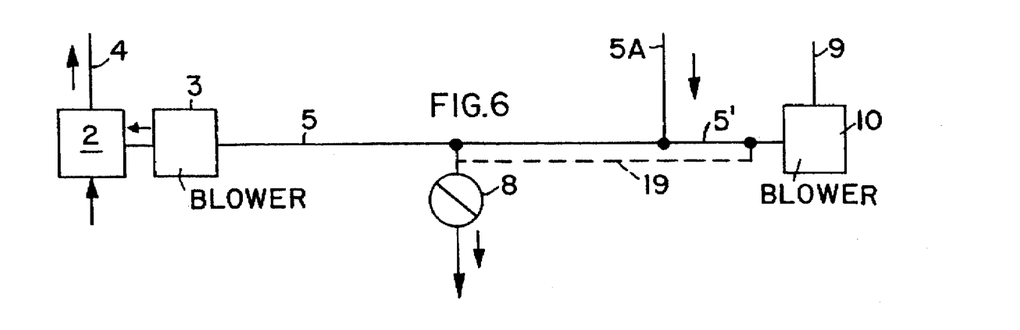
FIG. 6 shows a modified air discharge circuit compared to FIG. 1 for discharging used air to the atmosphere.

FIG. 6 shows a modification of the suction or exhaust duct 9 in that the outlet of the blower 10 is directly connected to the suction duct 5 leading to the pressure control valve 8 for discharge to the atmosphere. If desired, a direct connection 19 between the outlet of the blower 10 and the inlet of the pressure control valve 8 may be provided. In that case a portion 5' of the suction duct 5 is interrupted and bypassed by the direct duct 19.

Figure 7:
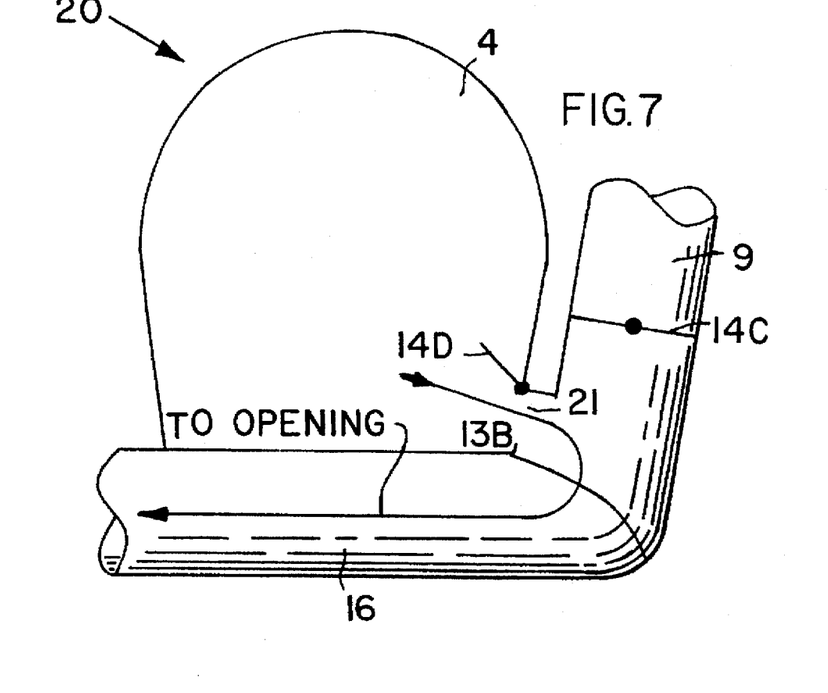
FIG. 7 shows a combination of two air duct sections and two valves switched so that fresh or mixed air is passed into the cabin through the respective air opening or openings not shown.
Figure 8:
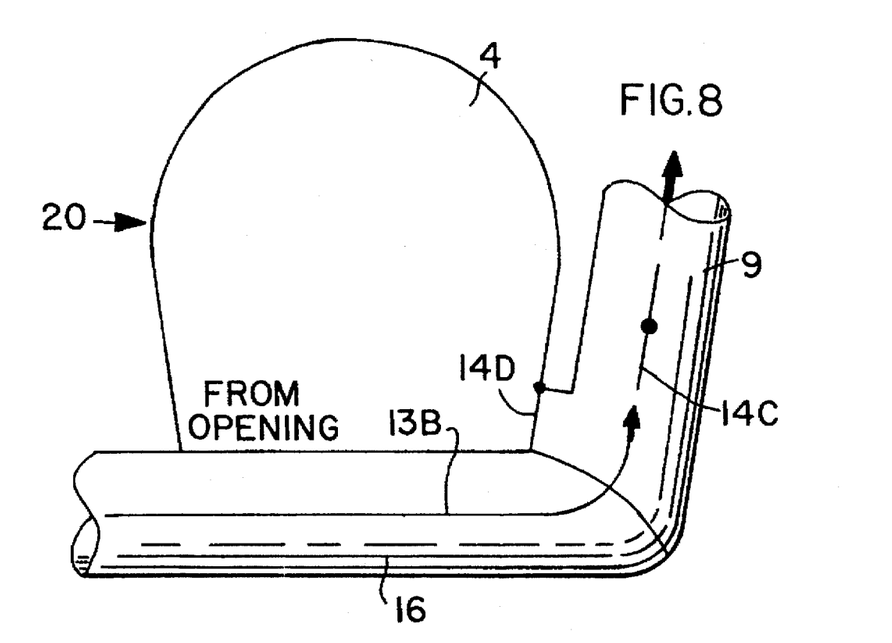
FIG. 8 is a view as in FIG. 7, but with the two valves switched so that used air is sucked out through an air opening.

Referring to FIGS. 7 and 8 in conjunction, a valve and duct unit 20 integrates, for example the valves 14C and 14D with portions or sections of the ducts 4, 9 and 16. The duct sections 4, 9 and 16 are joined and interconnected through an opening 21 such as a slot that can be opened and closed by the valve 14C. The valve 14D is shown in the duct section 9. In FIG. 7 the valve position corresponds to that of the valves 14C and 14D in FIG. 5. More specifically, the valve 14C is closed and the valve 14D is opened so that fresh air from the supply duct 4 is supplied through the duct section 16 to the opening 13B now functioning as an air outlet. In FIG. 8 the valve position is reversed corresponding now to that in FIG. 4 with the valve 14C open and the valve 14D closed. As a result, used air is removed through the opening 13B functioning as a suction port. Valve 14D is shown as a simple flap valve. Valve 14C is shown as a simple butterfly valve. However, other valve types may be used as desired for the intended purpose. In any of these combinations the unit 20 may be used for any of the air flow openings. Where the opening 13A is directly connected to the supply duct 12, the valve 14D will be permanently open and the valve 14C will be permanently closed.

Figure 9:
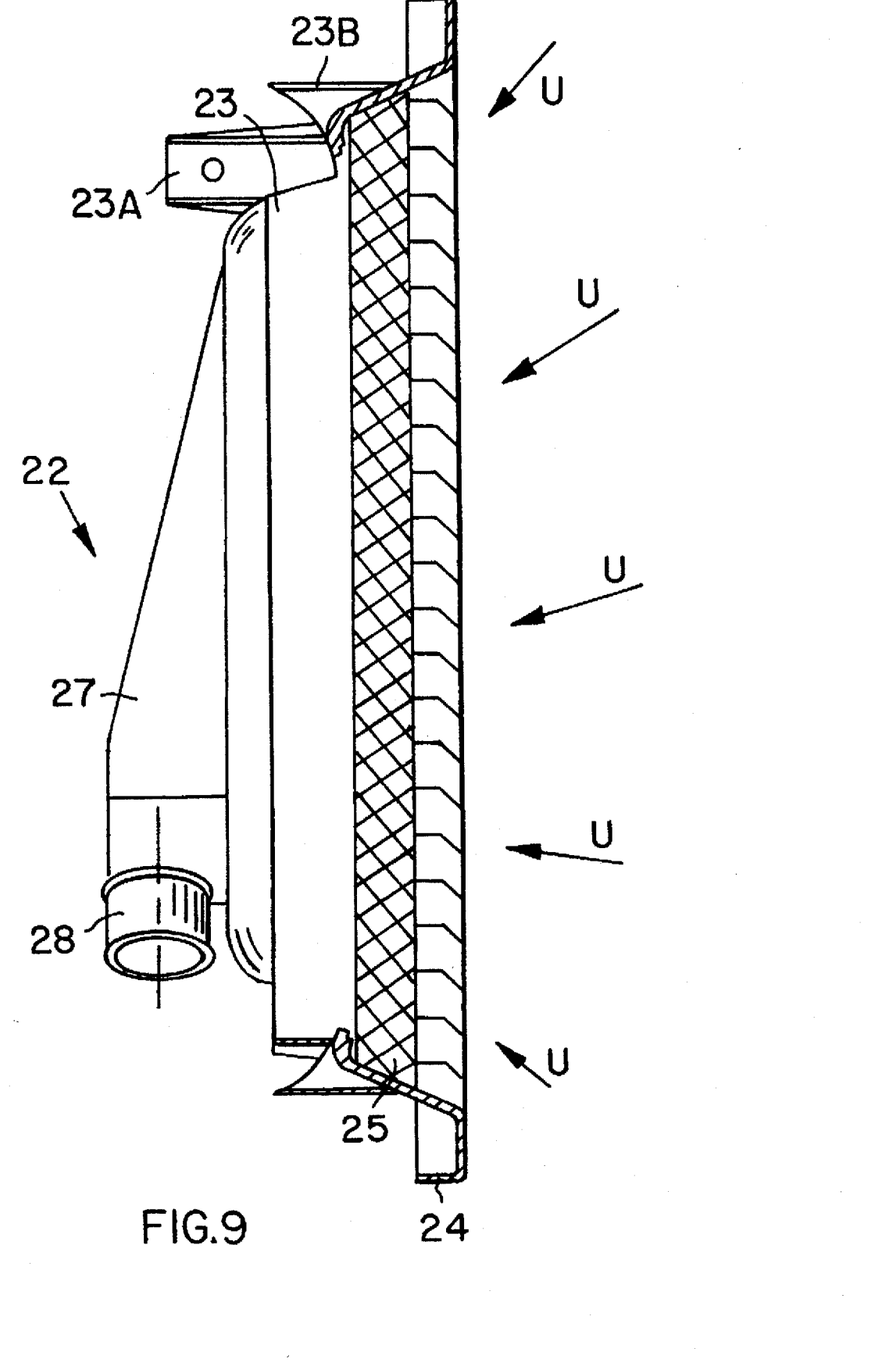
FIG. 9 is a side view partly in section of an airflow opening according to the invention shown serving as a suction port that can easily be changed to function as an air outlet.

FIG. 9 shows an air opening 22 according to the invention that is illustrated as a suction port, but can be easily modified as an air outlet. The opening 22 has a housing 23 provided with a mounting bracket 23A and a housing rim 23B into which a flange member 24 can be secured, for example, by a snap fit. The flange member 24 carries an exchangeable filter 25 and a cover grille 26 that may be adjustable for directing air in a desired direction when the air flow opening is used as an air outlet. The housing 23 has an adapter 27 opposite the grille 26 which leads the flow into a duct or pipe connector 28. This connector 28 will then be secured, for example to the branch pipe 15 or 16. As shown, the used air U is sucked through the grille 26 and the filter 25 to enter through the adapter 27 and the connector 28 into the respective pipe section. The opening 22 may be used as an air outlet. However, in that case a more effective air flow control may be achieved by replacing the flange member 24 with its grille 26 and filter 25 by a respective flange member that carries manually adjustable flaps for operation by the passenger to direct the air coming into the cabin into a direction convenient for the passenger.

Although the invention has been described with reference to specific example embodiments, it will be appreciated that it is intended to cover all modifications and equivalents within the scope of the appended claims.

What is claimed is:

1. A ventilating system for a passenger aircraft having a pressurizable body enclosing a cabin having a cabin floor, passenger seats on said cabin floor, a cabin ceiling above said seats, and an underfloor space in said body below said floor, said system comprising a plurality of first air flow openings (12) positioned in said cabin for serving individual passenger seats, a plurality of second air flow openings (13) in said ceiling for serving said cabin, a fresh air supply line (4) and an exhaust line (9) for removing used air from said cabin, a suction fan (10) connected to said exhaust line (9), at least a first pair and a second pair of air flow control valves (14), each pair of said air flow control valves comprising a first valve (14B; 14D) connected to said fresh air supply line (4) and a second valve (14A; 14C) connected to said exhaust line (9), said control valves forming said first pair (14A, 14B) being further connected to a first common junction (15), said control valves forming said second pair (14C, 14D) being further connected to a second common junction (16), said first common junction (15) being connected to said first air flow openings (12) for controlling the flow of fresh air through said first air flow openings (12) into said cabin and for controlling the flow of used air through said first air flow openings (12) out of said cabin depending on which of said first and second valves of said first pair of valves (14A, 14B) is open and which valve is closed, said second common junction (16) being connected to at least one of said second air flow openings (13) for controlling the flow of fresh air through said at least one second air flow opening (13) into said cabin and for controlling the flow of used air through said at least one second air flow opening (13) out of said cabin depending on which of said first and second valves of said second pair of valves (14C; 14D) is open and which valve is closed, whereby feeding of fresh air and removal of used air can be individually controlled for different areas of said cabin.

2. The ventilating system of claim 1, further comprising a main return flow line (5), air outlets (5A', 5B') positioned for collecting used air near said floor (6) and connected to said return flow line (5), a further suction fan (3) in said return flow line (5), an air mixer in said treated fresh air supply line, said air mixer having a first inlet connected to take in fresh air and a second inlet connected to said further suction fan for mixing used air and fresh air to provide treated air for feeding into said treated air supply line.

3. The ventilating system of claim 2, further comprising a tap line (7) connected to said return flow line upstream of said further suction fan (3) and a pressure responsive control valve (9) in said tap line (7) for discharging used air from said cabin and for maintaining pressurization in said cabin.

4. The ventilating system of claim 3, further comprising a filter (F) in said return flow line (5), said filter (F) being positioned just upstream of said further suction fan (3) and downstream of a junction (7A) between said tap line (7) and said return flow line (5).

5. The ventilating system of claim 1, further comprising a Laval nozzle (11) in said exhaust line (9) downstream of said suction fan (10) as viewed in the flow direction in said exhaust line for discharging used air out of said cabin to the atmosphere.

6. The ventilating system of claim 1, wherein said plurality of second air flow openings (13) comprise at least one second air flow opening (13A) directly connected to said treated air supply line (4) and another second air flow opening (13B) connectable to one of said treated air supply lines (4) and to said exhaust line (9) through said second pair of air flow control valves (14C, 14D).

7. The ventilating system of claim 1, wherein said plurality of second air flow openings comprise at least two second air flow openings (13A; 13B), said system further comprising a third pair of air flow control valves (14E; 14F) including a first air flow control valve (14F) for connecting one (13A) of said second air flow openings to said treated air supply line (4) and a second air flow control valve (14E) for connecting said one second air flow opening (13A) to said exhaust line (9), and wherein said second pair of control valves (14C; 14D) is connected to said at least one (13B) of said second air flow openings (13).

8. The ventilating system of claim 1, further comprising an air quality sensor (S1, S2) positioned for sensing air quality in said cabin for providing a control signal for automatically switching air flow control valves (14E, 14F; 14C, 14D) from an air supply position to an air withdrawal position and vice versa.

9. The ventilating system of claim 3, further comprising an auxiliary used air discharge line (19) connecting an outlet of said suction fan (10) to said tap line (7) upstream of said pressure control valve (8) for discharging used air out of said cabin to the atmosphere.

10. The ventilating system of claim 1, further comprising a first air flow duct section (4) connected to said treated air supply line, a second air flow duct section (9) connected to said exhaust line, and a third air flow duct section (16) leading to one of said first and second air flow openings (12, 13), and wherein a pair of said flow control valves (14C; 14D) is combined with said first, second, and third air flow duct sections to form a structural unit in which said first valve of said pair is connected to said first air flow duct section and said second valve of said pair is connected to said second air flow duct section.

11. The ventilating system of claim 1, wherein said first and second air flow openings (12, 13) comprise a housing (23), a pipe connector (28) secured to said housing, a protective grating (26) exchangeably secured to said housing (23) opposite said pipe connector (28), and an air filter (25) held in place in said housing by said protective grating (26).

12. The ventilating system of claim 11, further comprising a ring flange (24) removably fitting into said housing (23), said grating (26) and said filter (25) fitting into said ring flange for replacing said grating and filter with an exchangeable air distributor.

13. The ventilating system of claim 10, wherein said flow control valves are flap valves and/or butterfly valves positioned in said first and second air flow duct sections.

14. The ventilating system of claim 13, wherein said flap valves and/or butterfly valves are operable manually or electrically.

15. The ventilating system of claim 1, wherein at least one of said first and second air flow openings (12, 13) is positioned in each of several different cabin zones and areas, and wherein at least a plurality of said air flow openings in all cabin zones and areas are connectable to one of said exhaust line (9) and said treated air supply line (4).

16. An aircraft comprising an aircraft body enclosing a pressure cabin in said aircraft body and an air exchange system for said pressure cabin, said air exchange system comprising a plurality of air flow openings (12, 13) in said cabin for admitting treated air into said cabin or for removing used air from said cabin through said openings, an air treatment device (2) for providing treated air, an air supply line (4) connected to an outlet of said air treatment device (2), an air exhaust line (9) for removing used air from said cabin, a fan (10) for sustaining an air flow in said air exchange system at a required pressure, at least one pair of flow volume control valves (14A, 14B) arranged in a Y-configuration, said Y-configuration forming a first common port or junction (15) for both valves of a pair connected to a respective one of said air openings (12), a second port (9A), connecting one valve of a pair to said air exhaust line (9), and a third port (4A) connecting the other valve of said pair to said air supply line (4), whereby the supply of treated air or the removal of used air through the same air flow opening is controllable by respectively opening and closing the valves of a pair, said air exchange system further comprising a venturi device (11) connecting an outlet of said fan (10) to the atmosphere for discharging used air to the atmosphere while maintaining a required pressurization in said pressure cabin.

17. The aircraft of claim 16, comprising cabin floor air outlets (5A', 5B'), a further air exhaust line (5) connected to said cabin floor air outlets (5A', 5B') and a further suction fan (3) in said further air exhaust line (5) connected to an inlet of said air treatment device (2) for returning a portion of used air to said air treatment device (2), a tap line (7) connected to said further air exhaust line (5) upstream of said further suction fan (3), and a pressure control valve (8) in said tap line (7) for removing another portion of used air through said pressure control valve (8) to the atmosphere outside said aircraft.

18. The aircraft of claim 16, wherein said air openings (12, 13) in said cabin comprise a housing (23) a line connector (27, 28) secured to said housing (23), a flange member (24) removably secured to said housing (23), and at least one of a filter (25) and an air flow directing grille (26) in said flange member (4).

19. The aircraft of claim 17, further comprising an auxiliary exhaust line (19) connecting an outlet of said fan (10) directly to said tap line (7) just upstream of said pressure control valve (8).

20. An aircraft comprising an aircraft body enclosing a pressure cabin in said aircraft body and an air exchange system for said pressure cabin, said air exchange system comprising a plurality of air flow openings (12, 13) in said cabin for admitting treated air into said cabin or for removing used air from said cabin through said openings, an air treatment device (2) for providing treated air, an air supply line (4) connected to an outlet of said air treatment device (2), an air exhaust line (9) for removing used air from said cabin a fan (10) for sustaining an air flow in said air exchange system at a required pressure, at least one pair of flow volume control valves (14A, 14B) arranged in a Y-configuration, said Y-configuration forming a first common port or junction (15) for both valves of a pair connected to a respective one of said air openings (12), a second port (9A), connecting one valve of a pair to said air exhaust line (9), and a third port (4A) connecting the other valve of said pair to said air supply line (4), the supply of treated air or the removal of used air through the same air flow opening is controllable by respectively opening and closing the valves of a pair, said aircraft further comprising cabin floor air outlets (5A', 5B'), a further air exhaust line (5) connected to said cabin floor air outlets (5A', 5B') and a further suction fan (3) in said further air exhaust line (5) connected to an inlet of said air treatment device (2) for returning a portion of used air to said air treatment device (2), a tap line (7) connected to said further air exhaust line (5) upstream of said further suction fan (3), and a pressure control valve (8) in said tap line (7) for removing another portion of used air through said pressure control valve (8) to the atmosphere outside said aircraft.

21. The aircraft of claim 20, further comprising an auxiliary exhaust line (19) connecting an outlet of said fan (10) directly to said tap line (7) just upstream of said pressure control valve (8).

* * * * *

UNITED STATES PATENT AND TRADEMARK OFFICE
CERTIFICATE OF CORRECTION

PATENT NO. : 5,695,396

DATED : Dec. 9, 1997

INVENTOR(S) : Markwart et al.

It is certified that error appears in the above-identified patent and that said Letters Patent is hereby corrected as shown below:

Col. 2, line 52, replace "(Köster et al.)" by --(Kösters et al.)--.

Col. 11, line 28, after "cabin" insert --,--.

Col. 12, line 8, after "line (4)," insert --whereby--.

Signed and Sealed this

Third Day of March, 1998

*Attest:*

BRUCE LEHMAN

*Attesting Officer*      *Commissioner of Patents and Trademarks*